(12) United States Patent
Gretz

(10) Patent No.: US 6,604,400 B1
(45) Date of Patent: Aug. 12, 2003

(54) ELECTRICAL CONNECTOR

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 26 days.

(21) Appl. No.: 09/792,184

(22) Filed: Feb. 23, 2001

Related U.S. Application Data

(63) Continuation-in-part of application No. 09/603,756, filed on Jun. 26, 2000, now Pat. No. 6,335,488, which is a continuation of application No. 09/165,530, filed on Oct. 2, 1998, now Pat. No. 6,080,933, which is a continuation-in-part of application No. 09/007,532, filed on Jan. 15, 1998, now Pat. No. 6,043,432.

(51) Int. Cl.⁷ .......................... B21D 28/00; B21D 53/00
(52) U.S. Cl. ...................... 72/334; 72/348; 174/65 R
(58) Field of Search ...................... 72/334, 335, 348, 72/333; 174/65 R

(56) References Cited

U.S. PATENT DOCUMENTS

| | | | | |
|---|---|---|---|---|
| 3,006,981 A | * | 10/1961 | Weber | 174/65 R |
| 3,369,071 A | * | 2/1968 | Tuisku | 174/65 R |
| 3,855,862 A | * | 12/1974 | Moller | 72/334 |
| 4,453,395 A | * | 6/1984 | Takeda et al. | 72/348 |
| 5,171,164 A | * | 12/1992 | O'Neil et al. | 174/65 R |
| 5,200,575 A | * | 4/1993 | Sheehan | 174/65 R |
| 5,310,224 A | * | 5/1994 | Tenglund | 285/256 |
| 5,542,861 A | * | 8/1996 | Anhalt et al. | 439/578 |
| 5,731,543 A | * | 3/1998 | Jorgensen | 174/65 R |
| 5,761,949 A | * | 6/1998 | Dalessandro et al. | 72/334 |
| 6,034,326 A | * | 3/2000 | Jorgensen | 174/65 R |
| 6,080,933 A | * | 6/2000 | Gretz | 174/65 R |
| 6,114,630 A | * | 9/2000 | Gretz | 174/65 R |

* cited by examiner

Primary Examiner—Daniel C. Crane

(57) ABSTRACT

According to the present invention there is provided a modified stamped sheet metal connector comprising an enhanced cylindrical housing having an entry end aperture and an exit end aperture. The entry end aperture can accept the snap-in spring steel adapter of U.S. Pat. No. 6,080,933 as well as the exit end peripheral spring steel locking ring described in this patent to provide a connector that allows rapid and simplified installation of armored cable into a junction or circuit box. The improved cylindrical housing also includes about the periphery of the exit end a serrated finish to inhibit turning of the spring steel adapter, an additional aperture in the cylindrical housing in the area of the entry end for facilitating removal of the entry end snap-in spring steel retainer and an alternative internal flange system for retention of the spring steel adapter.

3 Claims, 11 Drawing Sheets

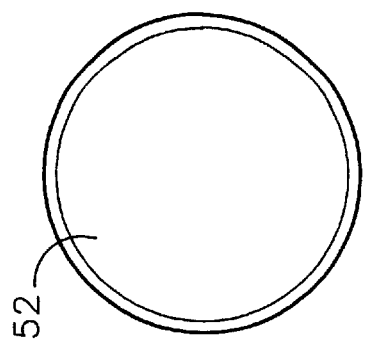
*FIG. 6*
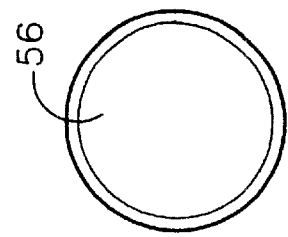
*FIG. 7*
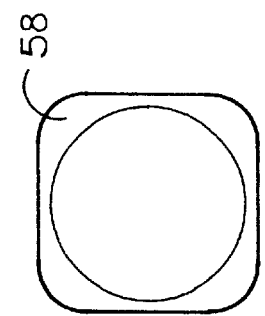
*FIG. 8*
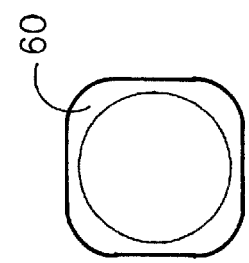
*FIG. 9*
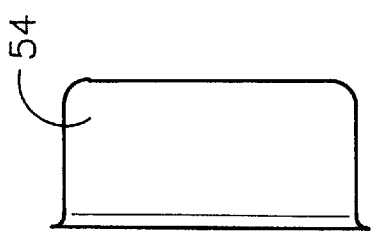
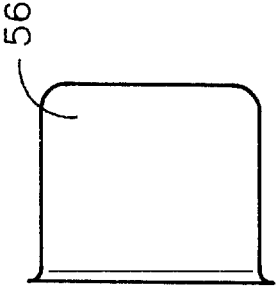
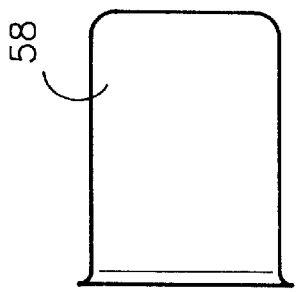
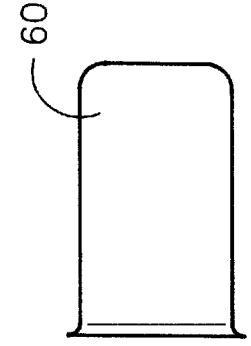

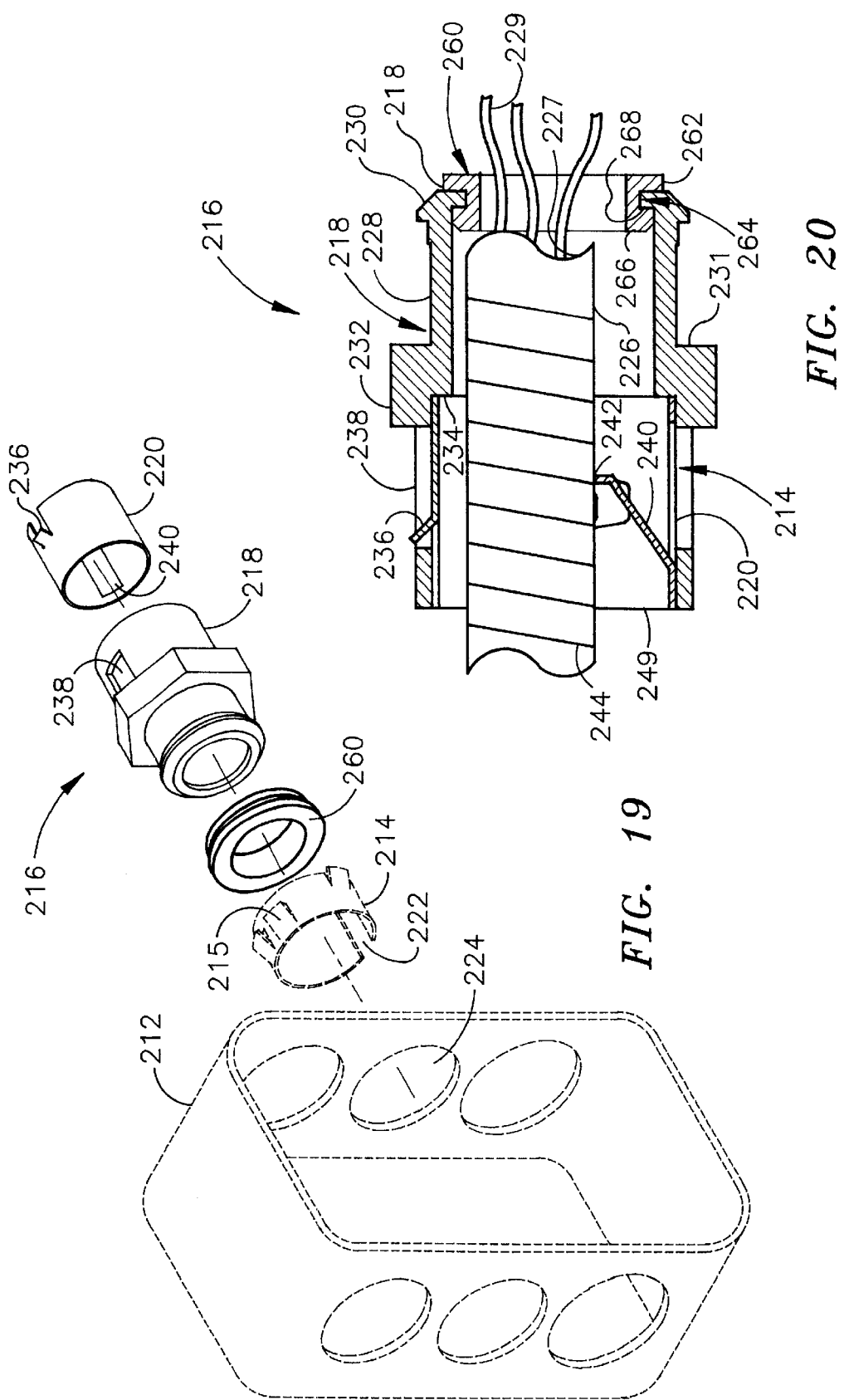

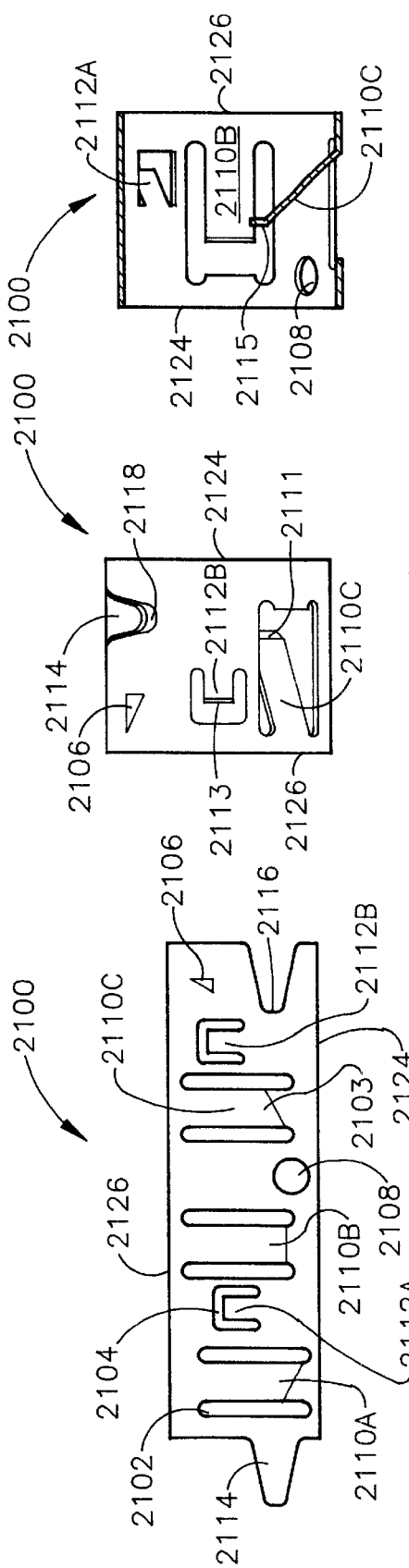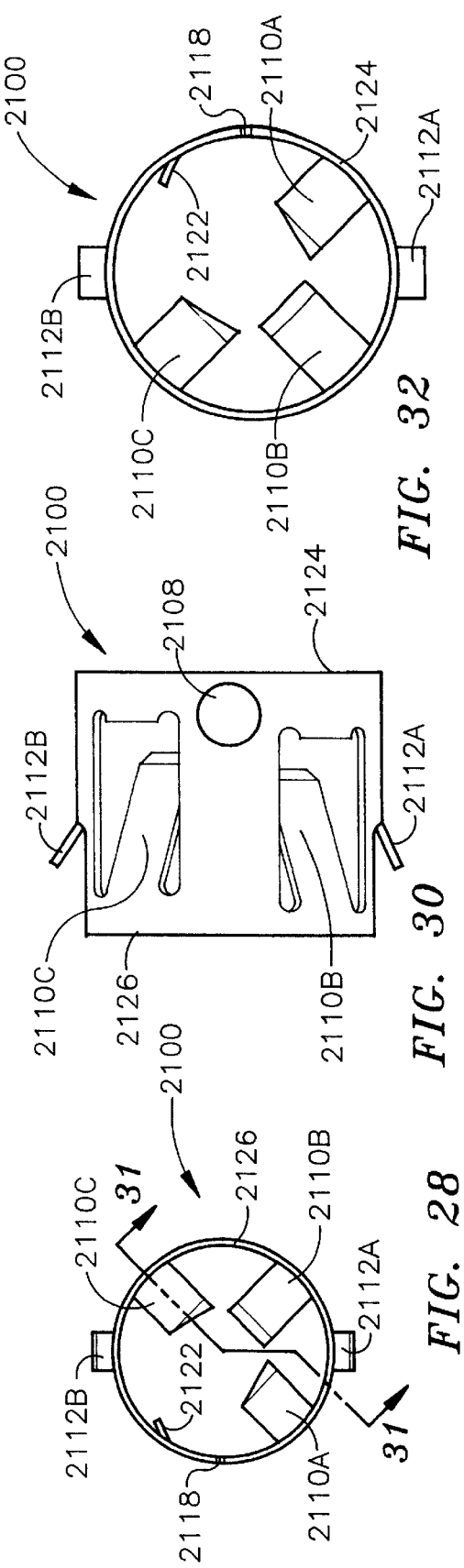

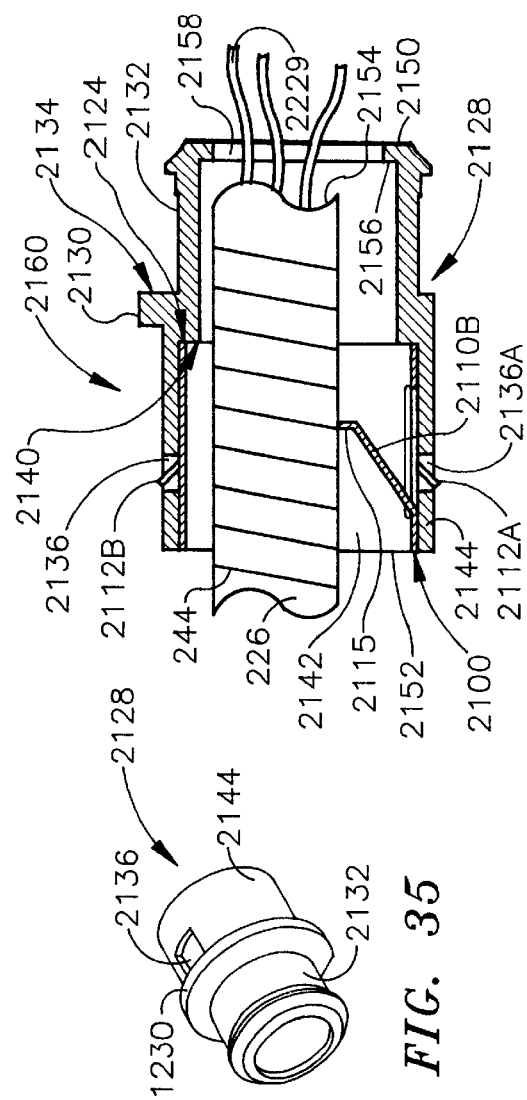
FIG. 37
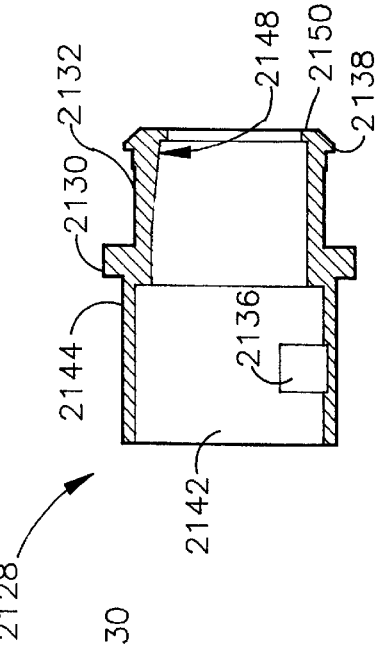
FIG. 38
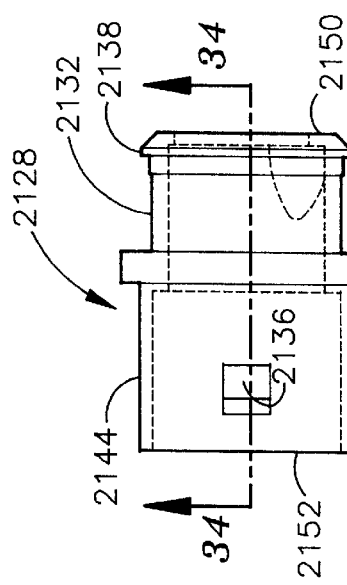
FIG. 35
FIG. 36
FIG. 33
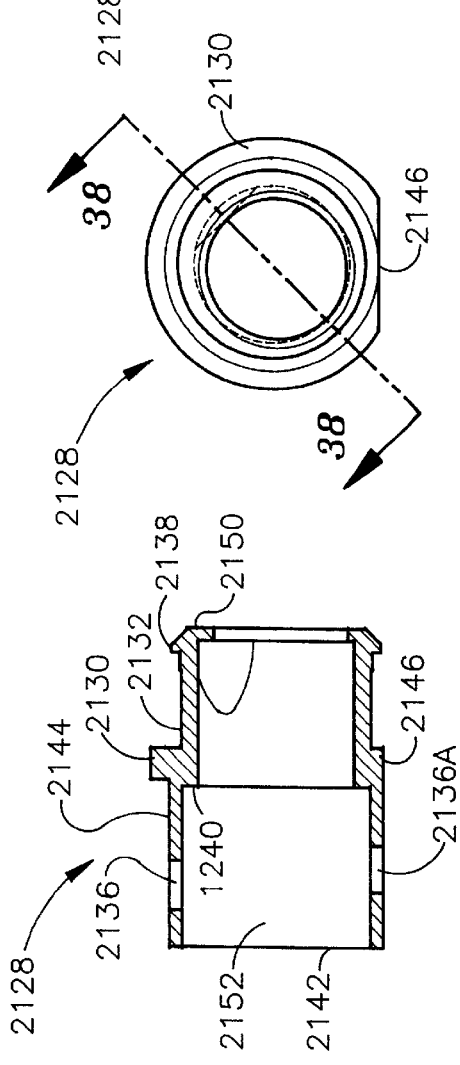
FIG. 34

ELECTRICAL CONNECTOR

The present invention is a continuation-in-part of patent application Ser. No. 09/603,756, filed Jun. 26, 2000, now U.S. Pat. No. 6,335,488, which is a continuation of 09/165,530 filed Oct. 2, 1998, now U.S. Pat. No. 6,080,933, which is a continuation-in-part of 09/007,532 filed Jan. 15, 1998, now U.S. Pat. No. 6,043,432.

FIELD OF THE INVENTION

The present invention relates to electrical cable clamps, and more specifically to electrical connectors including a back-out prevention feature for securing electrical cables to wiring enclosures.

BACKGROUND OF THE INVENTION

The wiring of electrical devices requires that electrical cables be inserted through openings or holes in junction boxes, panel boxes and the like. Electrical codes generally require that such access holes be substantially filled after insertion of electrical cable and the some means be provided to inhibit retraction of the electrical cable from the access hole after installation to eliminate the possibility of accidental disconnection of the electrical connections internal to the panel box, junction box, etc. The most commonly used connector to provide such utility until recently has been a two-part device that permitted passage of the cabling through a circular collar that passed through the access hole and provided means for securing the cabling inside the circular collar and a lock nut or other means for, in turn, securing the collar to the access hole. Such devices are unwieldy and sometimes difficult to install, especially when space is limited, because of the number of parts involved and the need to apply screw drivers and wrenches to attain proper and secure attachment.

More recently, unitary plastic, strain relief, cable connector clamps, that include a self-locking mechanism as well as a cable retention system have been developed and found broader application. This type of cable clamp or connector is essentially tubular with a slit along one side to enable the connector to be squeezed for insertion into the access hole in the panel box, junction box, etc. It then resiliently returns to its original shape and is provided with protruding ribs to lock it into the opening.

It is common practice to include in the tubular portion of such connectors, clamping elements that resiliently deflect as the cable is inserted, with the free end of the clamping element biased against the cable sheath so as to engage the sheath and thereby prevent the cable from being readily withdrawn from the opening after insertion and installation.

One such device is described in U.S. Pat. No. 5,594,209 to Nattel et al issued Jan. 14, 1997. This patent suggests a connector, as just described, that includes an internal clamping element that has a clamping lip that is resiliently pressed against the cable to prevent its removal from the connector. The clamping lip is described as having a reduced thickness at its free end and including additional projections on the inner wall of the tubular housing, which additional projections have abutment faces perpendicular to the axis of the housing.

U.S. Pat. No. 4,970,350 to Harrington, issued Nov. 13, 1990 describes a similar such connector device comprising a housing having first and second open ends and an inner wall forming a channel extending through the housing for receiving a cable. A coupling means is mounted within the housing for urging the cable towards the inner wall and includes a flange, means for grippingly engaging the cable between the inner wall and the flange, and an elongated bracing pin for providing resistance to bending of the flange.

While both of the foregoing patented devices provide useful solutions to the stated problem of providing a simple to use cable connector, their design is not optimal since they rely largely on simple friction or the presence of a single sharp surface to inhibit "pullout" of the inserted cable. Although the devices described in the foregoing patents allege an ability to retain a wide range of cable diameters, the range of their utility is really quite limited because of their design.

A better arrangement would provide a serrated engagement surface for retaining the inserted cable. Such a design provides a more secure retention of the inserted cable. The use of such a serrated surface, if properly designed, has the additional benefit of being more readily adaptable to a larger variety of cable diameters without sacrificing cable retention capability. The manufacture of such a connector using conventional plastic molding techniques is, however, not simple and requires redesign of the connector to obtain the required serrated contact points in such a process.

U.S. Pat. No. 6,080,933 issued Jun. 27, 2000 in the name of Thomas J. Gretz for, "Snap in Cable Connector" describes a locking cable connector composed of three mating pieces that snap together and provide a connector for helically wound armored or metal clad electrical conductors. A spring steel adapter is used in conjunction with an electrical junction box to fix the location of the locking cable connector with respect to the junction box. The first piece of the snap in locking cable connector is a die cast member including at its inbound end a smooth outer cylindrical section having an outer diameter with flanges that accommodates a spring steel adapter. The second piece is a spring steel locking ring provided to receive a helically wound shielded cable that is inserted into the out end of the die cast member. The locking ring has outwardly directed tangs that allow insertion into the die cast member but restrict withdrawal thereof from the die cast member by virtue of apertures in the walls of the entry end of the die cast cylindrical member. The locking ring also has oppositely or outwardly directed tangs to receive the armored cable and to restrict its movement in the opposite or withdrawal direction.

The spring steel locking ring has a cut out section that permits slight compression so that the locking ring may be easily inserted into the die cast member. Once inserted, the locking ring is able to expand to the full inner diameter of the die cast member to provide a tight and secure fit.

While all such prior art connector devices provide useful solutions to the problem of connecting armored or other cable to electrical boxes of one type or another, they are either relatively costly, if made of cast metal, or may lack adequate strength if molded from plastic. Accordingly, a simplified such connector device fabricated from stamped metal which demonstrates the strength of a cast fitting with a fabrication cost approaching that of a plastic such fitting would be highly desirable.

OBJECTS OF THE INVENTION

It is therefore an object of the present invention to provide a simpler and yet equally easily installed connector for the attachment of electrical cabling to electrical panel boxes, junction boxes and the like.

It is another object of the present invention to provide such a connector that is easily manufactured using conventional metal stamping techniques and therefore demonstrates a fabrication cost approaching that of molded or otherwise formed plastic, yet with the strength of steel.

It is yet a further object of the present invention to provide additional features such as the incorporation of an access port to permit easier extraction of armored cable secured in the snap-in connector of the present invention.

SUMMARY OF THE INVENTION

According to the present invention there is provided a modified stamped sheet metal connector comprising an enhanced cylindrical housing having an entry end aperture and an exit end aperture. The entry end aperture can accept the snap-in spring steel adapter of U.S. Pat. No. 6,080,933 as well as the exit end peripheral spring steel locking ring described in this patent to provide a connector that allows rapid and simplified installation of armored cable into a junction or circuit box. The improved cylindrical housing also includes about the periphery of the exit end a serrated finish to inhibit turning of the spring steel adapter, an additional aperture in the cylindrical housing in the area of the entry end for facilitating removal of the entry end snap-in spring steel retainer and an alternative internal flange system for retention of the spring steel adapter.

The present invention also provides a snap in locking cable connector composed of three mating pieces that snap together and provide a connector for helically wound armored or metal clad electrical conductors. A spring steel adaptor is used in conjunction with an electrical junction box to fix the location of the locking cable connector with respect to the junction box. A first piece of the snap in locking cable connector is a die cast member including at the inbound end a smooth outer cylindrical section, having an outer diameter with flanges that accommodates a spring steel adaptor. Another piece is a spring steel locking ring provided to receive a helically wound shielded cable and inserted into the out end of the die cast member. The locking ring has outwardly directed tangs, which allow insertion into the die cast member, but restricts withdrawal from the die cast member. The locking ring also has oppositely directed tangs to receive the armored cable and restrict its movement in a reverse direction.

The die cast member may have one or more flat surfaces around its periphery forming a hexagon on one of the flanges to allow gripping by a wrench or other tool for tightening or loosening or making minor adjustments in the positioning of the armored cable in the member once the armored cable is inserted into the steel locking ring. Rotating the die cast member in one direction will pull the armored cable and advance it further into the member.

The spring steel locking ring has a cut out section to permit slight compression so that the locking ring may be easily inserted into the die cast member. Once inserted, the locking ring is able to expand to the full inner diameter of the die cast member to provide a tight fit.

DESCRIPTION OF THE DRAWINGS

FIGS. 6 through 18 are side, top and bottom views that depict the steps in the preferred stamping procedure for the manufacture of the electrical connector of the present invention.

FIG. 19 is an exploded view of a junction box, a first embodiment of a spring steel adaptor and a snap in cable connector.

FIG. 20 is a sectional view of a snap in cable connector having an alternative embodiment of a die cast member and an alternative embodiment of a spring steel locking ring.

FIG. 27 is a plan view of a die-cut blank that will be formed into another alternative embodiment of the spring steel locking ring.

FIG. 28 is an end view of the embodiment of the spring steel locking ring 2100 from the trailing edge.

FIG. 29 is a top view of the spring steel locking ring 2100 of FIG. 28.

FIG. 30 is a side view of the spring steel locking ring of FIG. 28.

FIG. 31 is a cross-sectional view of the spring steel locking ring 2100 taken along lines 31—31 of FIG. 28.

FIG. 32 is an end view of the spring steel locking ring as viewed from the forward edge.

FIG. 33 is a side view of another embodiment of the die cast member.

FIG. 34 is a cross-sectional view of the die-cast member 2128 as taken along lines 34—34 of FIG. 33.

FIG. 35 is a perspective view of the die-cast member 2128 of FIG. 33.

FIG. 36 is an end view of the die-cast member 2128 as viewed from the right side of FIG. 33.

FIG. 37 is a cross-sectional view of the assembled die-cast member and spring steel locking ring including an inserted cable held in place by the staggered cable tangs.

FIG. 38 is a cross-sectional view of the die cast member taken along lines 38—38 of FIG. 36.

DETAILED DESCRIPTION

This application relates to U.S. patent application Ser. No. 09/792,175 filed concurrently herewith and entitled "Electrical Connector", invented by the same inventor and relates to the continuity of applications Ser. No. 09/603,756, filed Jun. 6, 2000, now U.S. Pat. No. 6,335,488, which is a is a continuation of U.S. Pat. No. 6,080,933, which is a continuation-in-part of U.S. Pat. No. 6,043,432, all of which patents are incorporated herein by reference and made a part hereof.

Figure 1:
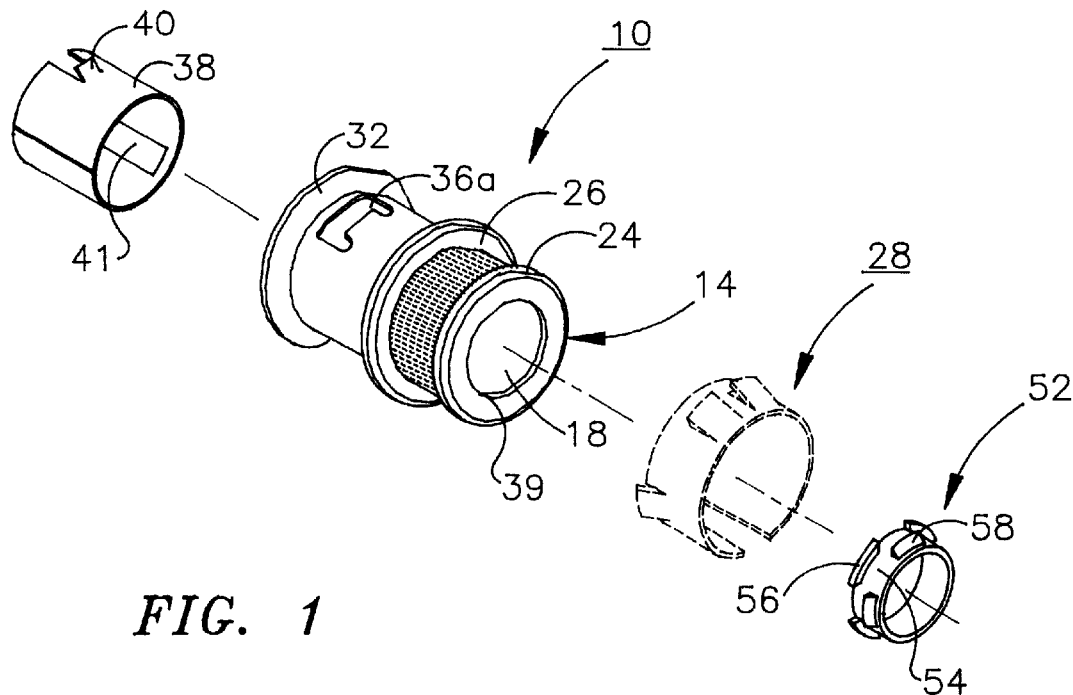
FIG. 1 is an exit side exploded view of the connector of the present invention.
Figure 2:
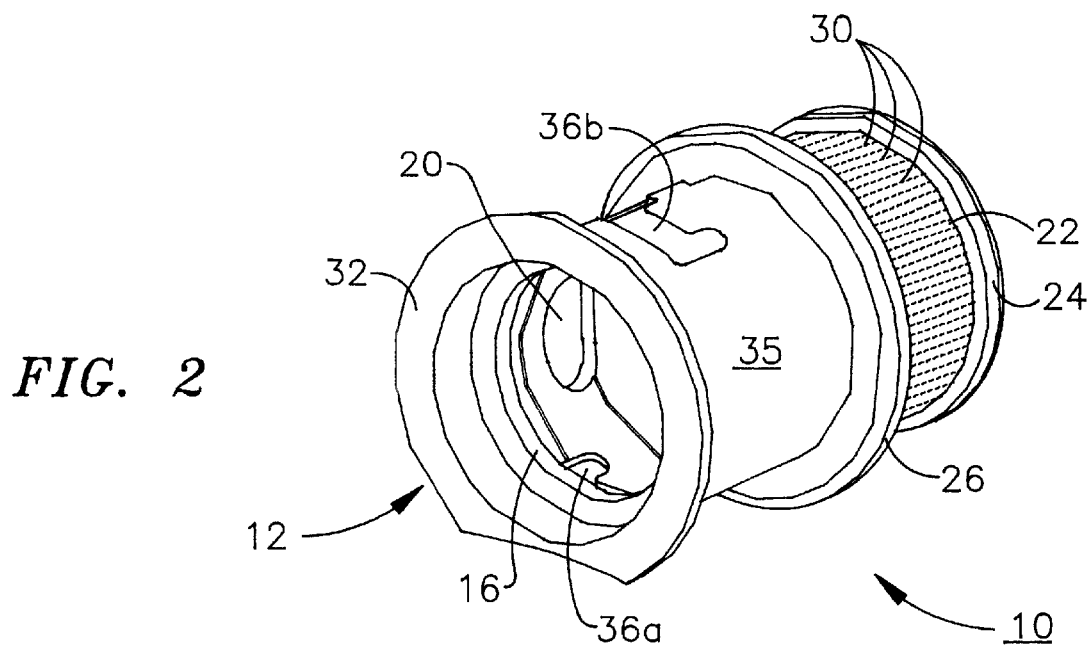
FIG. 2 is an entry side perspective view of the connector of the present invention.

Referring now to FIGS. 1 and 2, the enhanced cylindrical housing 10 of the present invention is provided as a replacement for the die cast member identified as "18" in U.S. Pat.

No. 6,080,933, which is hereby incorporated herein by reference in its entirety. Cylindrical housing 10 has an inbound or entry end 12 and an outbound or exit end 14 each including an aperture 16 and 18 respectively. Cylindrical housing 10 further includes an access port 20 whose multiple purposes will be described in greater detail hereinafter. Outbound end 14 further includes outbound end outer periphery 22 including annular flanges 24 and 26 that serve to retain a spring steel locking ring 28. Flange 26 is of a larger diameter than flange 24 to prevent over insertion of spring steel locking 28 as also described below. Spring steel locking 28 is identical to spring steel adapter "20" described in aforementioned and incorporated U.S. Pat. No. 6,080,933. Outbound end outer diameter 22 includes serrations 30 that are stamped, etched, engraved or otherwise formed into the surface of outbound end outer diameter 22. Serrations 30 serve to inhibit rotation of subsequently applied spring steel locking ring 28. According to a highly preferred embodiment of the present invention, a bushing 52 comprising a cylindrical body 54 having a pair of discontinuous flanges 56 and 58 that engage the inner periphery 39 of outbound end aperture 18 is inserted to prevent accidental damage to an inserted cable. Bushing 52 is designed to frictionally engage periphery 39 and is preferably made of a polymeric material tat serves to cushion cable inserted into housing 10 through inbound aperture 16 and exits through outbound aperture 18.

According to a first preferred embodiment, inbound end 12 includes about aperture 16 annular flange 32 that provides a convenient hand gripping surface for the insertion and removal of cylindrical housing 10 to and from an electrical junction box. The circumferential wall 35 of inbound end 12 also includes openings 36a and 36b for engagement of a plurality of tangs 40a of spring steel adapter 38 inserted into inbound end 12. Spring steel adapter 38 according to this embodiment is identical to spring steel adapter "14" as described in U.S. Pat. No. 6,080,933 and incorporates at least three inward extending tangs 41 for engaging an inserted cable thereby restricting its movement in a reverse direction.

Figure 3:
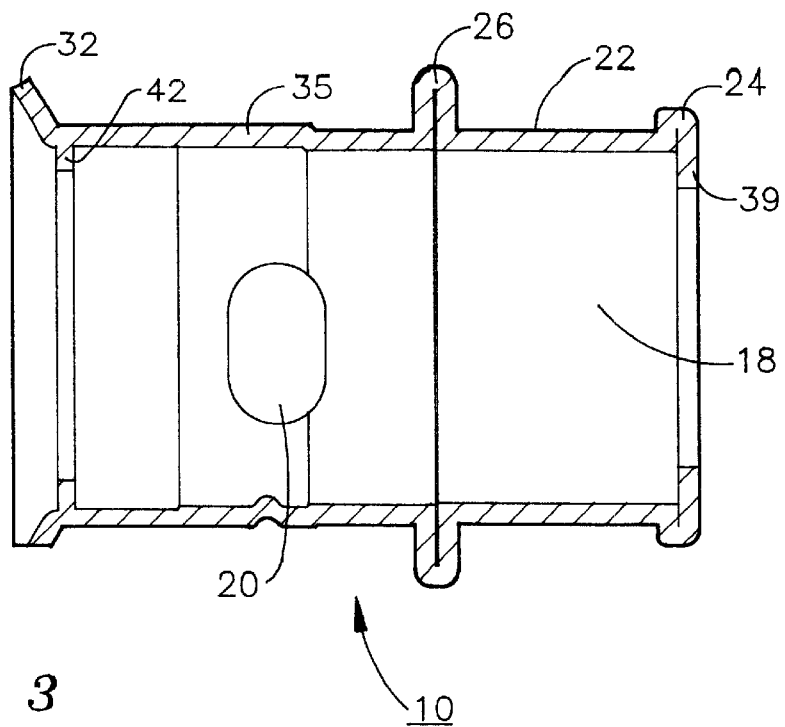
FIG. 3 is an entry side perspective view of an alternative embodiment of the stamped metal cylindrical member of the connector of the present invention.

In the alternative preferred embodiment of cylindrical housing 10 depicted in FIG. 3, tang engagement apertures 36a and 36b are eliminated in favor of an internal annular groove or ridge 42 about aperture 16. Internal annular groove or ridge 42 serves the same purpose as apertures 36a and 36b, namely the retention of spring steel locking ring 38 inside of cylindrical housing 10. The compressabiltiy of spring steel locking ring 38 as described in U. S. Pat. No. 6,080,933 permits insertion of spring steel locking ring 38 into aperture 16 in the same fashion as the spring steel locking ring depicted in FIG. 1.

As a yet further preferred embodiment, tang apertures 36a and 36b as well as annular groove or ridge 42 can be eliminated with tangs 40 to frictionally engage the interior wall of cylindrical housing 10 thereby providing an interference fit for locking ring 38 inside of cylindrical housing 38. In this fashion, locking ring 38 will resist removal after insertion by the action of tangs simply 40 frictionally engaging or gouging into the interior walls of cylindrical housing 38.

Figure 4:
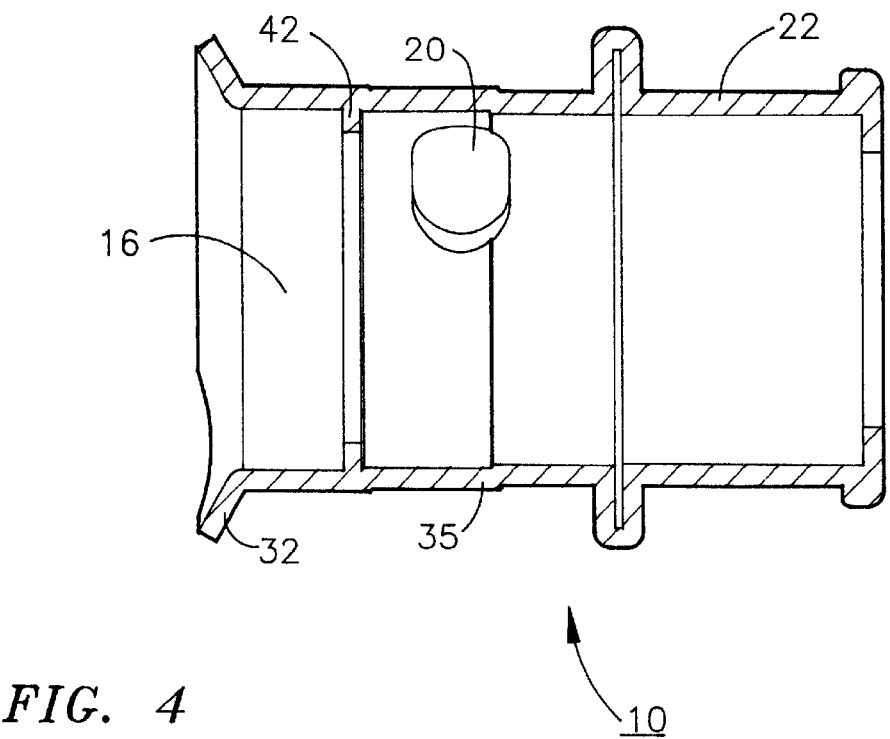
FIG. 4 is a cross-sectional view of a further preferred alternative embodiment of the cylindrical housing of the present invention.

In yet a further preferred embodiment depicted in cross section in FIG. 4, internal annular groove or ridge 42 is relocated to the position of previously described apertures 36a and 36b and spring steel locking ring 38 includes tangs 40. In this configuration, tangs 40 engage internal annular groove or ridge 42 in lieu of engaging apertures 36a and 36b, but with the same result that spring steel locking ring 38 and consequently any contained cable are securely retained in position after insertion and connection to an appropriate electrical box. It should be noted that either structure, a ridge or a groove 42 that engages tangs 40 is fully acceptable according to this embodiment of the invention.

Figure 5:
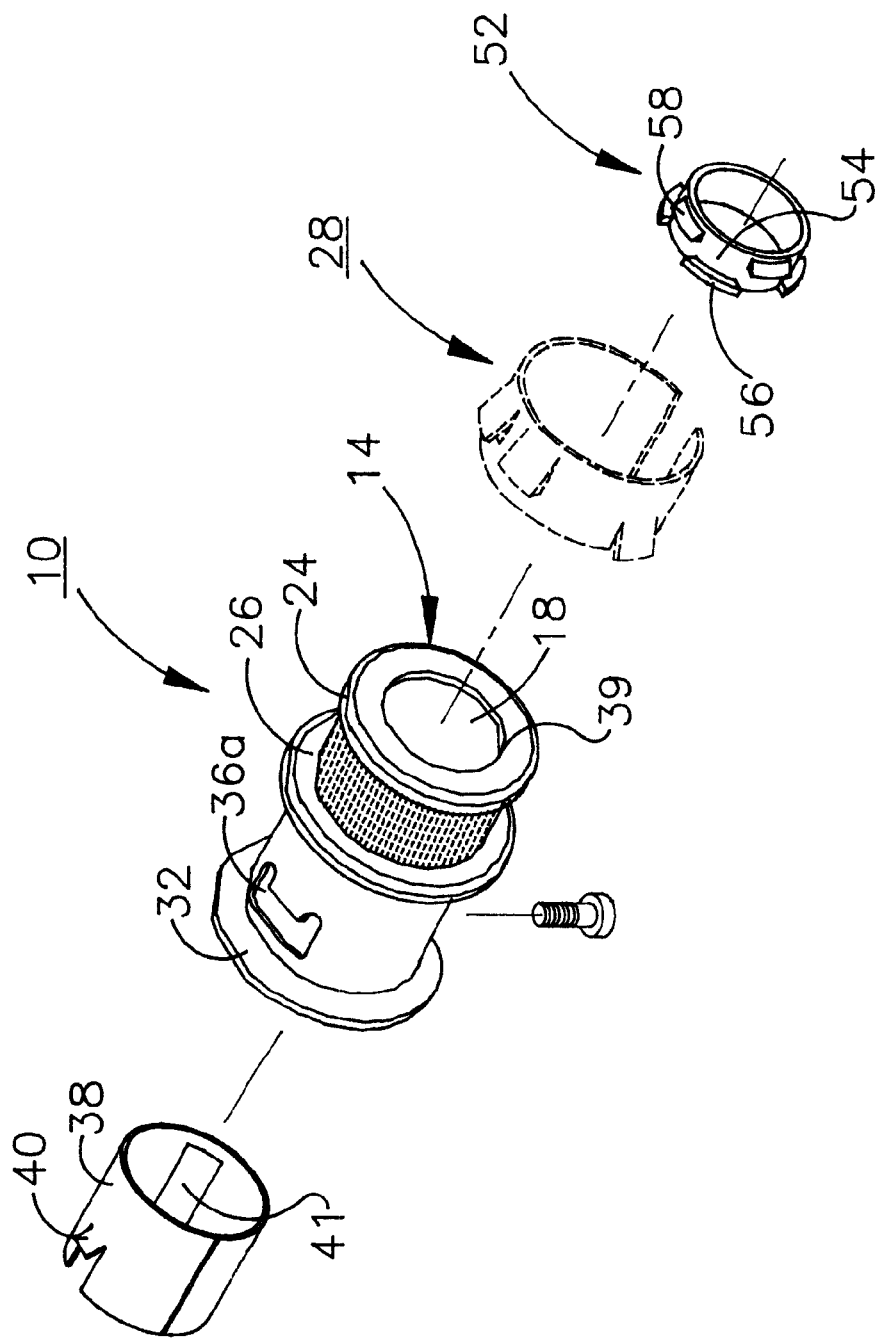
FIG. 5 is an exploded view of an alternative embodiment of the electrical connector of the present invention.

Yet another preferred embodiment of the present invention is shown in FIG. 5. According to this embodiment, tangs 40 have been eliminated and a screw 50 inserted into aperture 20 to retain spring steel ring 38 in its proper location. In this case, aperture 20 would preferably be threaded to receive screw 50 so that screw 50 can serve as a set or retaining screw. As will be apparent to the skilled artisan, a rivet or similar fastener can be substituted for screw 50 in this embodiment.

In previous iterations of devices similar to that described herein, for example that described in U.S. Pat. No. 6,080,933 some difficulty has been encountered with removal cable from the connector and issues have arisen because of the inability of the installer to see the location of cable ends within the connector. The purpose of previously described aperture 20 is to provide both a viewing port to locate the positioning of cable within cylindrical member 10 as well as an added access for the compression of spring steel locking ring 38 when it becomes necessary to remove a previously installed cable.

The enhanced cylindrical housing 10 of the present invention is preferably stamped from a blank of planar sheet metal using a series of progressive dies according to methods and techniques well known in the sheet metal stamping art. The cost of such manufacture is significantly less than that of die casting as used for the production of the cylindrical housing disclosed in U.S. Pat. No. 6,080,933. This is largely due to the increased speed with which stamped parts can be produced as opposed to the rather time consuming die casting process. It is preferred that the sheet metal be coated with mechanical zinc.

Figure 12:
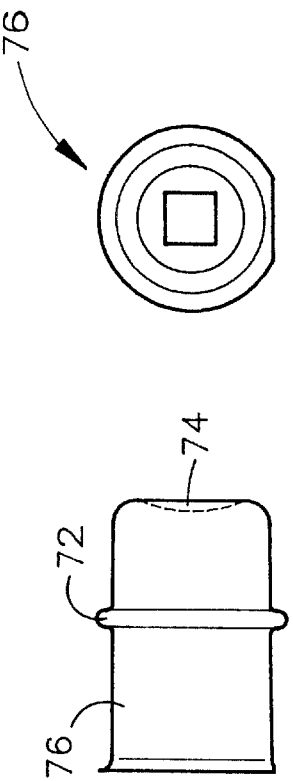
Figure 13:
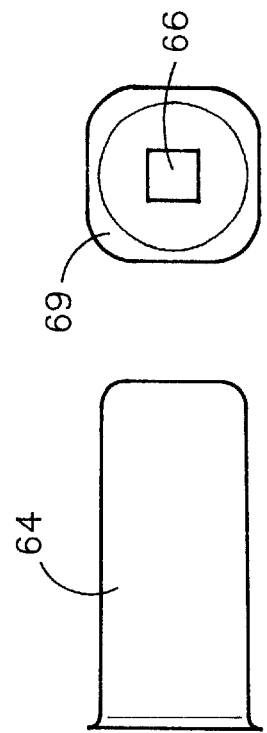
Figure 10:
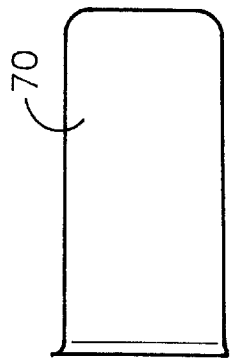
Figure 11:
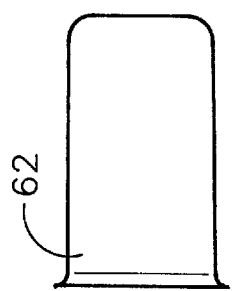

Referring now to FIGS. 6 through 18 that depict the various steps in the stamping process for manufacturing cylindrical housing 10. The starting material for the manufacturing process it's a flat steel blank 52, preferably bright zinc coated, and about 2¾ inches in diameter and 0.40 inches thick. Flat steel blank 52 is stamped and drawn in a cupping press to form a cup 54 about 1½ inches in diameter and about ¾ of an inch tall as shown in FIG. 6. Cup 54 is then drawn further as depicted in FIG. 7 to form a cup 56 about 1 inch tall and about 1 inch in diameter. Cup 56 is then further drawn to form a yet deeper cup 58 having a bottom diameter of about $31/32$ of an inch, a top diameter of about 1⅛ inches and a height of about $1^{13}/_{32}$ inches. Cup 58 is then drawn yet further to yield cup 60 shown in FIG. 9 having a height of about 1¾ inches, and a bottom diameter of about $25/32$ of an inch. As shown in FIG. 10 cup 60 is then struck again and drawn to provide cup 62 having a diameter of about ¾ of an inch an a slight taper toward the bottom of the cup. As depicted in FIG. 11, cup 62 is then struck again to increase its height by about 1/16 of an inch and punch out a $17/64$ of an inch hole 66 in its bottom to form, cylinder 64. Cylinder 64 is then trimmed to transform its base 68 from a 1⅛-inch generally rectangular shape to about a $31/32$ of an inch round having a flat edge as shown in FIG. 12. The resulting cylinder is shown as element 70 in FIG. 12. Cylinder 70 is then struck to form an approximately 1 inch diameter peripheral rim 72 having a depth of about $3/32$ of an inch and an about 1/16 of an inch spherical depression 74 formed in the bottom of cylinder 76 as shown in phantom in FIG. 13. Cylinder 76 is shortened from its configuration as cylinder 70 in FIG. 12 to a height of about $1^{27}/_{64}$ inches.

Figure 14:
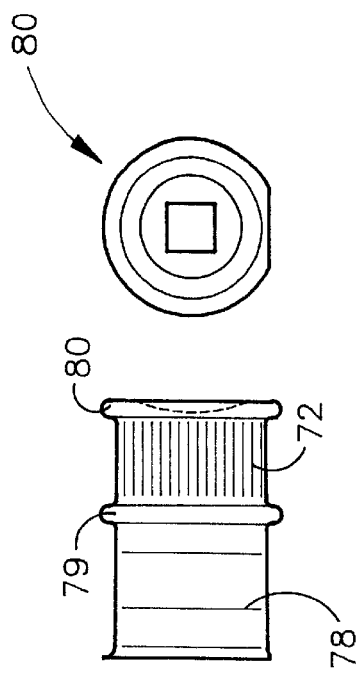
Figure 16:
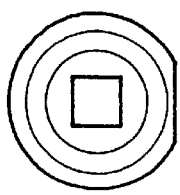
Figure 18:
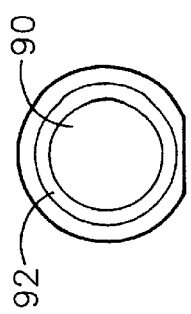
Figure 15:
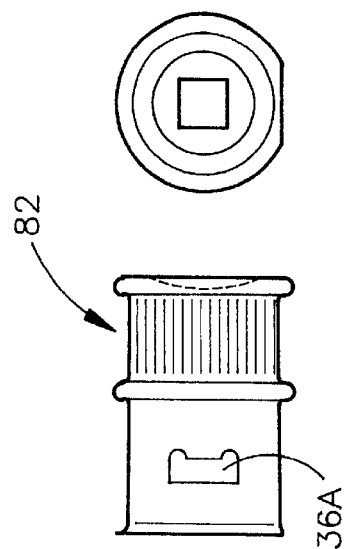
Figure 17:
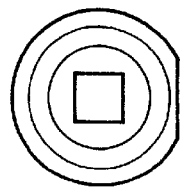

Cylinder 76 is then struck again to form a 53/64 of an inch in diameter by 3/32-inch thick ring 80 about its bottom forming cylinder 78 as shown in FIG. 14. Serrations 79 are also added during this step. The cylinder of FIG. 14 is then modified by the cutting of cutouts 36a and 36b about 3/8 of an inch long in the walls thereof to form cylinder 82 shown in FIG. 15. Only aperture 36a is shown in the FIG. 15, but as will be clear from previous Figures, aperture 36b is located at 180° from aperture 36a about the periphery of cylinder 82. Slot or aperture 20 is then punched into the wall of cylinder 82 to yield cylinder 84 as shown in FIG. 16. If desired, four notches 86 at 90° from one another can then be formed in cylinder 84 to form cylinder 88. As the final manufacturing step, cylinder 88 has a 17/32 of an inch hole 90 punched in its bottom 92 and bottom 92 returns to a flat surface from the previously indented surface as shown in FIG. 18. While there are clearly other methods for the manufacture of the electrical connector of the present invention, the foregoing supplies a preferred method of manufacture.

A continual problem in building construction is the problem of running armored cable for electrical connections. Many connectors require that there exist enough room with the junction box to permit insertion of a screw driver to tighten the cable and fix its position with respect to the junction box. Still other connectors can fix the position of the cable with respect to the junction box. However, once the connection is made, the cable cannot be backed out without the connection to the junction box being taken apart, which may not always be done easily.

In practicing the present invention, a three piece snap in cable connector is configured for use with a helically wound cable that locks into the junction box. The snap in cable connector is arranged to grip the helical grooves in an armored cable securely to lock it in position with respect to the cable connector.

Referring now to FIG. 19, an exploded view of a junction box 212, a snap in cable connector 216 with spring steel adapter 214, a die cast member 218, and a spring steel locking ring 220 is illustrated. Spring steel adapter 214 includes a slot 222 to permit expansion prior to being fitted over the reduced diameter area 228. Adapter 214 fits into aperture 224 of junction box 212. Adapter 214 also includes a plurality of tangs 215 to prevent removal of adapter 214 once inserted into aperture 224. A more detailed operation of adapter 214 may be found in U.S. Pat. No. 5,373,106, "Quick-Connect Fitting For Electrical Junction Box", assigned to the same assignee as the present invention and is incorporated herein by reference in its entirety.

FIG. 20 is a cross-sectional view of cable connector 216 illustrating the interconnection of die cast member 218 and spring steel locking ring 220 and the locking function of spring steel locking ring 220 around an armored cable 226.

The die cast member 218 is illustrated as having a reduced diameter area 228 for receiving adapter 214. A lip 230 prevents adapter 214 from slipping out once inserted. Lip 230 has a slight incline to permit insertion into aperture 224 of junction box 212. On the other side of area 228 is a perpendicular face 231 as part of an enlarged hexagonal section 232. The diameter of face 231 is greater than the diameter of lip 230 to prevent over insertion into aperture 224. Die cast member 218 with adapter 214 can be inserted into aperture 224 only up to the face 231 of section 232. Section 232 with its flat parallel surfaces forms a hexagonal shape when viewed from the end. When steel locking ring 220 is inserted with its cable gripping tangs, this hexagonal shape allows gripping with a standard fixed or adjustable wrench to draw armored cable 226 into the steel locking ring 220. In this manner, minor adjustments to the position of armed cable 226 can be effected. The inner diameter of die cast member reduces on the inside of section 232 to form face or should 234 to restrict insertion of steel locking ring 220. Thus, the inside diameter of the locking ring is approximately the same as the inside diameter of the shoulder 234.

A steel locking ring 220 is illustrated as inserted into die cast member 218 with a first tang 236 in a corresponding opening 238 in die cast member 218. As is seen, the spring steel tang 236 has an outward extending angle which permits the tang to be depressed inward as the steel locking ring is inserted into the outer aperture 49 of the member 218, yet spring outward into openings 238 and 238A to prevent withdrawal. Also illustrated is cable tang 240 in steel locking ring 220, gripping the bottom of the helical recesses of armored cable 226 at point 242 in helical groove 244. Shoulder 234 of die cast member 218 is positioned such that the end of tang barely clears the end of opening 238 before steel locking ring 220 reaches a place where it cannot be inserted further.

As is seen in FIG. 20, the armored cable 226 is cut at the end 227 of the connector, which is just inside the inner end. The wires 229 are connected on the inside of the junction box. Also shown in FIG. 20 is a plastic grommet 260 that has flange 262 preventing full insertion into the inner end of the connector. The grommet has a reduced diameter section 264 and latch 266 that fit over a ridge 268 on the connector. The grommet can be pushed into the connector until the latch 266 catches on the ridge 268. The grommet prevents chafing of the wires 229 and helps retain the armored cable 226 in the connector.

Figure 21:
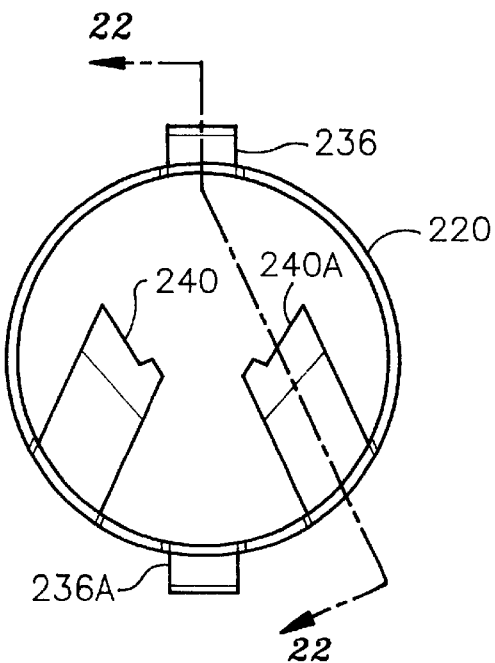
FIG. 21 is a sectional view of the alternative embodiment of the spring steel locking ring of FIG. 20.

Referring now the FIG. 21, an end view of the first embodiment of a steel locking ring 220 is illustrated as having two tangs 236 and 236A to provide locking stability when inserted into die cast member 218. It is to be noted that tangs 236 and 236A have angled outward surfaces and relatively flat axial surfaces since the force that needs to be exerted on die cast member 218 is in direct line with the direction of insertion and removal. Generally cylindrical spring steel locking ring 220 is provided to receive armored cable 226 and lock it into die cast member 218. Steel locking ring 220 has a first set of tangs 236 and 236A to allow insertion into die cast member 218 while restricting withdrawal of locking ring 220 from die cast member 218. The first set of tangs 236 and 236A includes a pair of tangs located at one end of locking ring 220 with the pair of tangs spaced on opposite side from each other. In an alternate arrangement, the first set of tangs includes three tangs (not shown) located at one end of locking ring 220. The three tangs may be equally spaced along the circumference of the generally cylindrical spring steel locking ring 220.

Also illustrated are two cable gripping tangs 240 and 240A for securely holding armored cable 226 in position. The surfaces of tangs 240 and 240A have a relatively flat axial surface with the tangs angled inward toward the inner end of the member 218. As is seen, the tangs 236, 236A, 240 and 240A are lanced from the cylindrical wall of the locking ring 220. The inside end 241 of cable gripping tangs 240 and 240A are bent on a radial direction and jagged with points since the force that needs to be exerted is helical or twisting in nature and a flat surface would slide along groove 244 of armored cable 226. In FIG. 21, steel locking ring 220 shows the second set of tangs oppositely directed from the first set of tangs to receive armored cable 226 and prevent its removal in a reverse direction. The second set of tangs includes a pair of tangs 240 and 240A, centrally located from the ends of locking ring 220, the pair of tangs 240 and 240A are spaced one hundred twenty degrees apart from each other along the internal circumference of locking ring 220. This arrangement pushes armored cable 226 against one side of steel locking ring 220 when there is an attempt to pull armored cable 226 from snap in cable connector 226, reducing the effective diameter of steel locking ring 220 to the diameter of armored cable 226. Another embodiment, the second set of tangs may include three tangs (not shown) centrally located in locking ring 220, the three tangs may be spaced one hundred twenty degrees apart from each other along the internal circumference of locking ring 220. In this arrangement the tangs evenly distribute the force that may be exerted to remove the cable around the outside of armored cable 226, with the tangs digging into groove 244.

Figure 22:
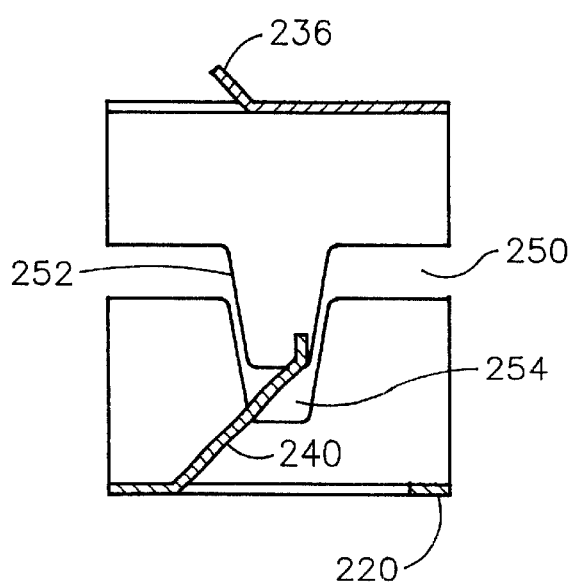
FIG. 22 is a side sectional view of the spring steel locking ring taken along lines 22—22 of FIG. 21.

FIG. 22 illustrates an arrangement of the steel locking ring having a slot 250 with an offset piece or tongue 252 on one side of slot 250 that fits into a concomitant cutout 254 on the other side of slot 250. Slot 250 permits compression of steel locking ring 220 to an outer diameter smaller than the inner diameter of die cast member 218. This arrangement allows easy insertion of steel locking ring 220 into die cast member 218 and expansion of the outer diameter of steel locking ring 220 to fit tightly into the inner diameter of die cast member 218. Slot 250 with offset piece 252 on one side with concomitant cutout 254 on the other side assures that tangs 236 and 236A of steel locking ring 220 remain aligned with openings 238 and 238A of die cast member 218. Without offset piece 252 and cutout 254, compression of steel locking ring 220 permitted by slot 250 may result in a sliding of one side of slot 250 with respect to the other or deforming of a locking ring 220 so that one tang, for example, tang 236, may align with opening 238 while due to deformation, tang 236A is still outside die cast member 218 and does not align with opening 238A.

Figure 23:
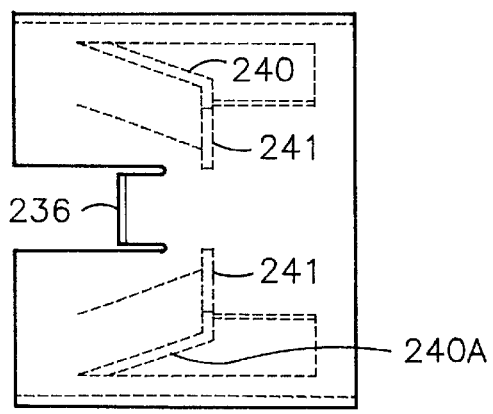
FIG. 23 is a top view of the spring steel locking ring of FIG. 22.

FIG. 23 is a top view of steel locking ring 220 of FIG. 21 with cable holding and tangs 240 and 240A shown in phantom with inside end 241 shown. As can be seen, tang 240 is displaced from tang 240A approximately one hundred twenty degrees along the inner circumference of steel locking ring 220.

Figure 24:
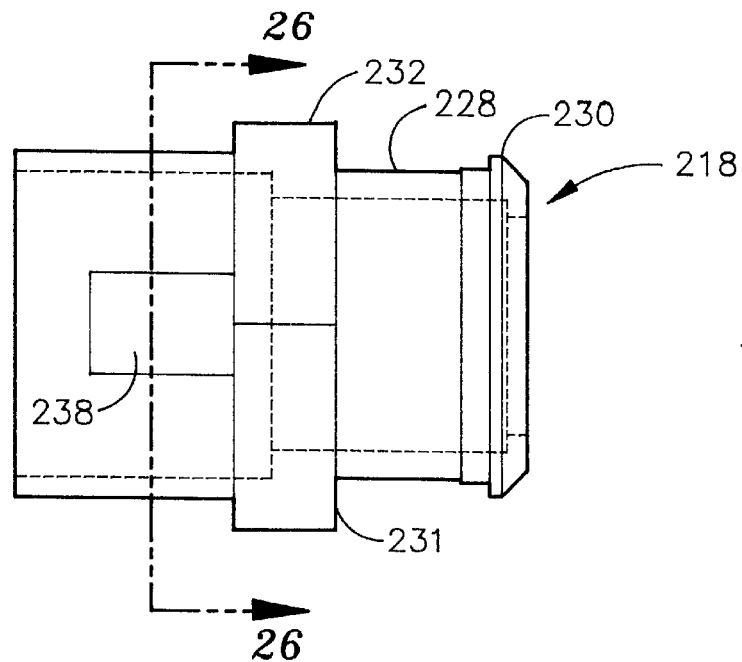
FIG. 24 is a side view of the die cast member of FIG. 20.

Referring now to FIG. 24, a side view of die cast member 218 is illustrated as having reduced diameter area 228 for receiving adaptor 214. Reduced area 228 is defined by lip 230, which prevents adaptor 214 from slipping out once inserted, and enlarged flat face 231. As stated previously, lip 230 has a slight incline to permit insertion into aperture 224 of junction box 212. Also previously stated, face 231 is greater than the diameter of lip 230 to prevent over insertion into aperture 224. As can be seen by a comparison of the diameters of lip 230 and face 231, die cast member 218 with adaptor 214 can be inserted into aperture 224 only up to the edge of section 232.

Figure 25:
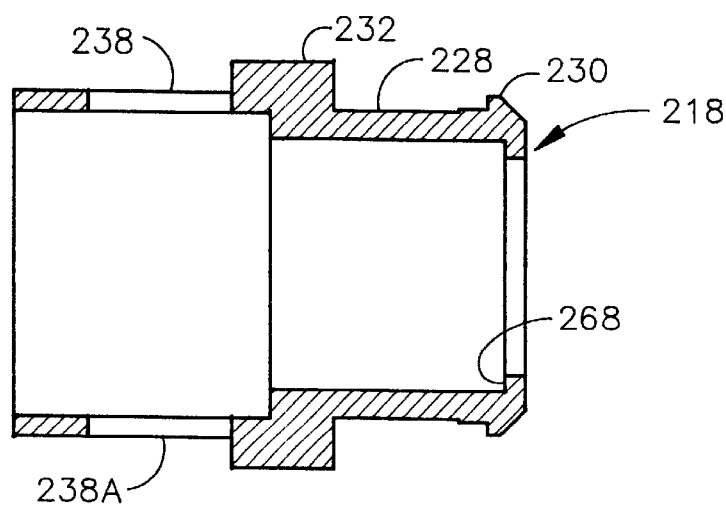
FIG. 25 is a side sectional view of the die cast member of FIG. 24.

FIG. 25 is a sectional view of the die cast member 218 illustrating first opening 238 to receive tang 236 of steel locking ring 220 and a second opening 238A to receive tang 236A of steel locking ring 220.

Figure 26:
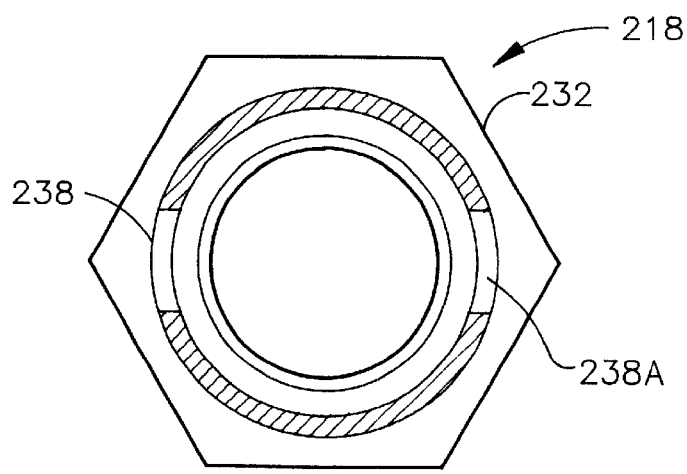
FIG. 26 is an end view of the die cast member of FIG. 24 taken along lines 26—26.

FIG. 26 is an end view of die cast member 218 illustrated in FIG. 24. As described previously and illustrated more clearly in FIG. 26, section 232 with its flat parallel surfaces forms a hexagon shape when viewed from the end. This shape is provided to allow gripping with a standard fixed or adjustable wrench. By rotating the wrench, (not shown) armored cable 226 may be drawn into the locking ring 220. In this manner, minor adjustments to the position of armored cable 226 can be performed.

FIG. 27 is a plan view of a die-cut blank that will be formed into another embodiment of the spring steel locking ring 2100. A plurality of lateral slots 2102 are formed in pairs along the blank. Adjacent pairs of the lateral slots 2102 are joined by cuts 2103 extending between them. U-shaped cutouts 2104 are also formed in the blank. The blank has a forward edge 2124 which will be positioned toward a junction box (not shown) and a trailing edge 2126 which will be positioned away from the junction box. As shown in FIG. 27, both the lateral slots 2102 and U-shaped cutouts 2104 are positioned at staggered distances from the forward edge 2124. The blank also includes a triangle cut 2106 positioned near the trailing edge 2126 and an aperture 2108 which will be used to hold the blank in a mandrel (not shown) while the blank is formed into the tubular shaped spring steel locking ring 2100. When the blank is formed into its tubular shape, tongue 2114 will partially enter the groove 2116 formed on the opposite end of the blank. Lateral slots 2102 and cuts 2103 define staggered tangs 2110a, 2110b, 2110c which are positioned at varying precalculated distances from the forward edge 2124.

FIG. 28 is an end view of the spring steel locking ring 2100 from the trailing edge 2126 after it has been formed into its tubular shape. A gap 2118 remains between the two ends of the locking ring where the tongue 2114 (not shown) approaches but does not contact the groove 2116 (not shown). The purpose of the gap 2118 is to depart a collapsible action to the spring steel locking ring 2100 so that slight pressure on the outer periphery of the locking ring 2100 will collapse it thereby allowing it to interact with and enter the chamber of a separate piece of the invention, a die-cast member (not shown). FIG. 28 depicts the orientation of the staggered tangs 2110a, 2110b, 2110c, outward projecting tangs 2112a, 2112b and triangle-shaped cable gripper 2122 on the tubular shaped locking ring 2100. The outward projecting tangs 2112, 2112b are defined by the U-shaped cutouts 2104 (not shown) and are positioned essentially 180 degrees apart on the outer periphery of the locking ring 2100. The triangle-shaped cable gripper 2122 and the staggered tangs 2110a, 2110b, 2110c are all oriented inwardly on the tubular-shaped locking ring 2100.

FIG. 29 is a top view of the spring steel locking ring 2100 of FIG. 28. As shown in FIG. 29, the edge 2111 of the staggered cable tangs (2110c depicted) are oriented toward the forward edge 2124 which will be oriented toward the junction box (not shown). By being oriented toward the forward edge 2124, edges 2111 of the staggered cable tangs (2110c depicted) will be able to grip and hold an armored cable (not shown) that will be inserted from the direction of the trailing edge 2126. Conversely, the outward projecting tangs (2112b shown) will be oriented with their edges 2113 toward the trailing edge 2126 of the spring steel locking ring 2100.

FIG. 30 is a side view of the spring steel locking ring of FIG. 28. As depicted in FIG. 30, the outward projecting tangs 2112a, 2112b are at staggered distances from trailing edge 2126. Two staggered cable tangs 2110b, 2110c are depicted at staggered distances from forward edge 2124.

FIG. 31 is a cross-sectional view of the spring steel locking ring 2100 taken along lines 31—31 of FIG. 28. Staggered cable tang 2110c is depicted extending inwardly into the tubular shaped locking ring 2100. An angled end 2115 is shown near the end of staggered cable tang 2110c.

FIG. 32 is an end view of the spring steel locking ring as viewed from the forward edge 2124. The staggered cable tangs 2110a, 2110b, 2110c are oriented toward the forward edge 2124.

A side view of the die-cast member 2128 is shown in FIG. 33. The generally tubular-shaped die-cast member 2128 has a central flange 2130 located approximately mid-way along its length. Flanking the central flange 2130 are a reduced diameter seat 2132 and a rear cylindrical body portion 2144. The die-cast member 2128 includes a forward end 2150 and a rearward end 2152. The forward end 2150 will be oriented toward a junction box (not shown) when put in use. A lip 2138 is located at the forward end 2150 of the die cast member 2128 and the lip 2138 and central flange 2130 define the boundaries of reduced diameter seat 2132. The seat 2132 will later accommodate a spring steel adapter (not shown) that will connect the die-cast member to a junction box (not shown). Cylindrical body portion 2144 includes openings (2136 shown) that will later accommodate the outward projecting tangs (not shown) of the spring steel locking ring (not shown).

FIG. 34 is a cross-sectional view of the die-cast member 2128 as taken along lines 34—34 of FIG. 33. A hollow chamber 2142 is formed in the rearward portion of the die-cast member 2128. The chamber 2142 will later accommodate the spring steel locking ring 2100 (not shown). Openings 2136, 2136a in the tubular body of the die-cast member 2128 will later accommodate the outward projecting tangs (not shown) of the spring steel locking ring. By being staggered at different distances from the rearward end. 2152 of the die-cast member 2128, the openings 2136, and 2136a will require that the spring steel locking ring (not shown) be oriented such that each outward projecting tang seats in its proper opening. As shown in FIG. 34, central flange 2130 extends outward of the main body portion of the die-cast member 2128 throughout most of its periphery except for a flat edge 2146 on one side.

FIG. 35 is a perspective view of the die-cast member 2128 of FIG. 33 and depicts the relative positioning of the central flange 2130, rear cylindrical body portion 2144, one opening 2136 in the rear cylindrical body portion, and the reduced diameter seat 2132.

FIG. 36 is an end view of the die-cast member 2128 as viewed from the right side of FIG. 33. Central flange 2130 is shown extending around most of the periphery of the tubular-shaped die-cast member 2128 except for flat edge 2146. Flat edge 2146 will enable easier turning of the die-cast member 2128 with respect to a junction box (not shown) once the two are adjoined.

FIG. 37 is a cross-sectional view of the assembled die-cast member 2128 and spring steel locking ring 2100 including a cable 226 inserted within the assembly and held in place by the staggered cable tangs (2110b shown). To create the connector assembly 2160, the installer puts gentle pressure on the outer periphery of the spring steel locking ring 2100 compressing its outer diameter and closing the gap (not shown). The spring steel locking ring 2100, in its compressed diameter state, is then slipped into the cylindrical chamber 2142 at the rearward end 2152 of the die-cast member 2128. The spring steel locking ring 2100 is rotated until outward projecting tang 2112Pb snaps into opening 2136 in the rear cylindrical body portion 2144 and outward projecting tang 2112a snaps into opening 2136a. As the outward projecting tangs 2112a, 2112b are at staggered distances from the edge of the spring steel locking ring 2100, the locking ring 2100 has only one orientation with respect to the die-cast member 2128 as the two are joined.

The cable 226 is then inserted within the connector assembly 2160. The cable 226 is an armored clad cable having helical grooves 244 around its periphery. An installer would typically push the cable into the chamber 2142 containing the spring steel locking ring 2100 at the rear 2152 of the die-cast member 2128 and advance it until the end 2154 of the cable contacted the ridge 2156 at the forward end 2150 of the die-cast member 2128. Wires 229 typically extend through the mouth 2158 of the die-cast member 2128.

As it is advanced into the connector assembly 2160, the staggered cable tangs (2110b shown) force the cable 226 against the inner surface of the connector assembly. Referring to FIG. 28, it can be seen that the three staggered cable tangs 2110a, 2110b, 2110c force the cable (not shown) against the cable gripper 2122 on the opposite side of the spring steel locking ring 2100. Referring again to FIG. 37, the staggered cable tangs (2110b shown) are staggered longitudinally along the spring steel locking ring 2100 at the proper distance to allow each staggered cable tang to engage one of the helical grooves 244 on the cable 226. Staggered cable tang 2110b is depicted engaging the helical groove 244 of the cable 226 in FIG. 37. The angled end 2115 of the staggered cable tang 2110b enables the tang to bite directly into the helical groove 244. The combination of the staggered cable tangs biting into the helical grooves and the cable gripper engaging the cable surface prevent the cable 226 from being pulled out of the connector assembly 2160. An adapter clip (not shown) can then be slid over lip 2138 until engaging flat face 2134. The adapter clip will seat on the reduced diameter seat 2132 of the connector assembly 2160.

The connector assembly 2160, including an installed adapter, can then be snapped into place in the knock-out of a junction box. The connector assembly 2160 will advance into the junction box (not shown) until flat face 2134 of central flange 2130 engages the wall of the junction box. The adapter then fastens the connector assembly to the junction box and the cable is locked in position with respect to the die-cast member by the combined action of the staggered cable tangs and the cable gripper.

FIG. 38 is a cross-sectional view of the die-cast member 2128 taken along line 38—38 of FIG. 36. The die-cast member 2128 includes a thicker wall portion 2148 adjacent its forward end 2150. The thicker wall portion 2148 works in conjunction with the staggered cable tangs (not shown) of the spring steel locking ring to force the cable to the opposite side of the channel and against the cable gripper (not shown).

A snap in locking cable connector has been described that is composed of three mating pieces that snap together and provide a connector for armored or metal clad electrical conductors. One piece includes a die cast member having a smooth outer cylindrical section. This section accommodates a spring steel adaptor. The smooth cylindrical section has flanges at each end defining to hold the spring steel adaptor in place. The spring steel adaptor is used in conjunction with an electrical junction box to fix and lock in the locking cable connector with respect to the junction box. Another piece includes a spring steel locking ring provided to receive a helical shielded or armored cable. The spring steel locking ring locks into the die cast member. The spring steel locking ring has tangs allowing unidirectional insertion into the die cast member and restricting withdrawal from the die cast member. The spring steel locking ring also includes oppositely directed cable gripping tangs to permit reception of the armored cable in one direction and restrict its movement in the reverse direction.

Thus, the use of the connector permits a simple assembly by snapping the helical armored cable into the connector and snapping the connector and cable to the junction box. The connector can be slightly rotated to take up any slack with the armored cable if the inside ends 241 of the tangs rest at the bottom of a groove, which requires some tightening.

As the invention has been described, it will be apparent to those skilled in the art that the same may be varied in many ways without departing from the spirit and scope of the invention. Any and all such modifications are intended to be included within the scope of the appended claims.

What is claimed is:

1. A method for fabricating a cylindrical housing for a snap in cable connector from a sheet metal blank comprising:
   1) stamping the sheet metal blank to form a first cup about 1½ inches in diameter and ¾ of an inch tall;
   2) drawing the first cup further to form a second cup about 1 inch tall and 1 inch in diameter;
   3) drawing the second cup yet further to form a third cup having a bottom diameter of about $31/32$ of an inch, a top diameter of about 1⅛ inches and a height of about $1^{13}/_{32}$ inches;
   4) drawing the third cup to form a fourth cup having a height of about 1¾ inches and a bottom diameter of about $25/32$ of an inch;
   5) drawing the fourth cup to form a fifth cup having a diameter of about ¾ of an inch with a slight taper toward the bottom of the cup;
   6) striking the fifth cup to extend its height about $1/16$ of an inch and punch out an about $17/64$ of an inch hole in the bottom thereof to form a first cylinder having a bottom end in the area of said punched out hole and a generally rectangular top end about 1⅛ inches across;
   7) trimming said generally rectangular top end of said fifth cup to form a product cylinder to a generally round end having a $31/32$ of an inch in diameter with one flat side;
   8) striking the product cylinder of step 7 to form
      A) an approximately 1 inch in diameter peripheral rim having a depth of about $3/32$ of an inch about the approximate middle third of said cylinder and
      B) an about $1/16$ of an inch spherical depression in said bottom end;
   9) shortening the product cylinder of step 8 to a height of about $1^{27}/_{64}$ of an inch;
   10) striking the product cylinder of step 9 to form an approximately $53/64$ of an inch in diameter by $3/32$ of an inch thick peripheral ring about the outside of said bottom end;
   11) cutting a pair of 180° displaced cutouts about ⅜ of an inch long in the wall of the product cylinder of step 10;
   12) punching or cutting an access aperture in the wall of the cylinder product of step 11 spaced about 90° about the periphery from said cutouts; and
   13) punching a $17/32$ of an inch hole in said cylinder bottom and flattening said cylinder bottom.

2. The method of claim 1 wherein said sheet metal blank is sheet steel having a diameter of about 2¾ inches and a thickness of about 0.40 inches.

3. The method of claim 2 wherein said steel blank is zinc coated.

* * * * *